P. BRIER.
HEATING SYSTEM FOR AUTOMOBILES.
APPLICATION FILED MAR. 26, 1915.
1,211,667.
Patented Jan. 9, 1917.
2 SHEETS—SHEET 1.
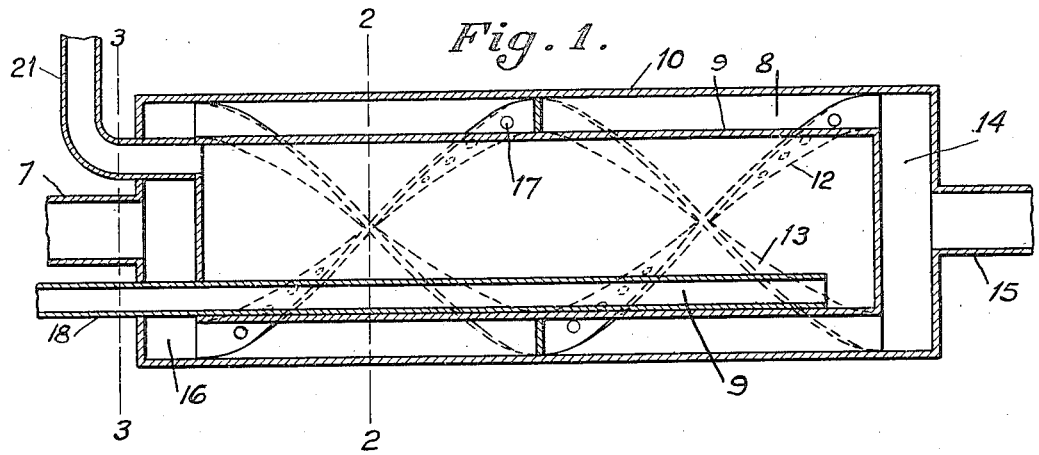
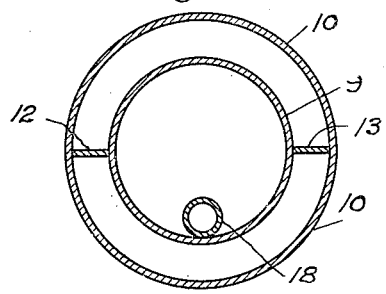
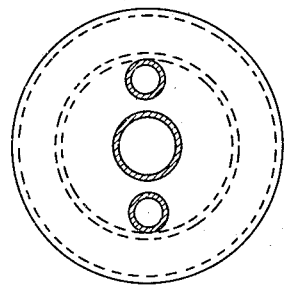
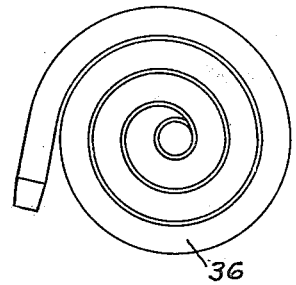
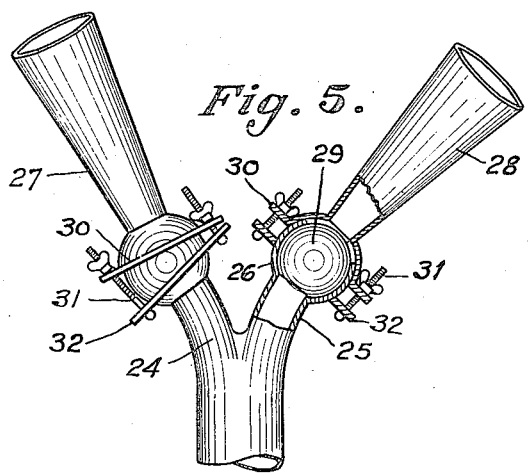
WITNESSES:
A W Pick
E. L. Webber
INVENTOR.
Paine Brier
BY
ATTORNEY P. BRIER.
HEATING SYSTEM FOR AUTOMOBILES.
APPLICATION FILED MAR. 26, 1915.
1,211,667.
Patented Jan. 9, 1917.
2 SHEETS—SHEET 2.
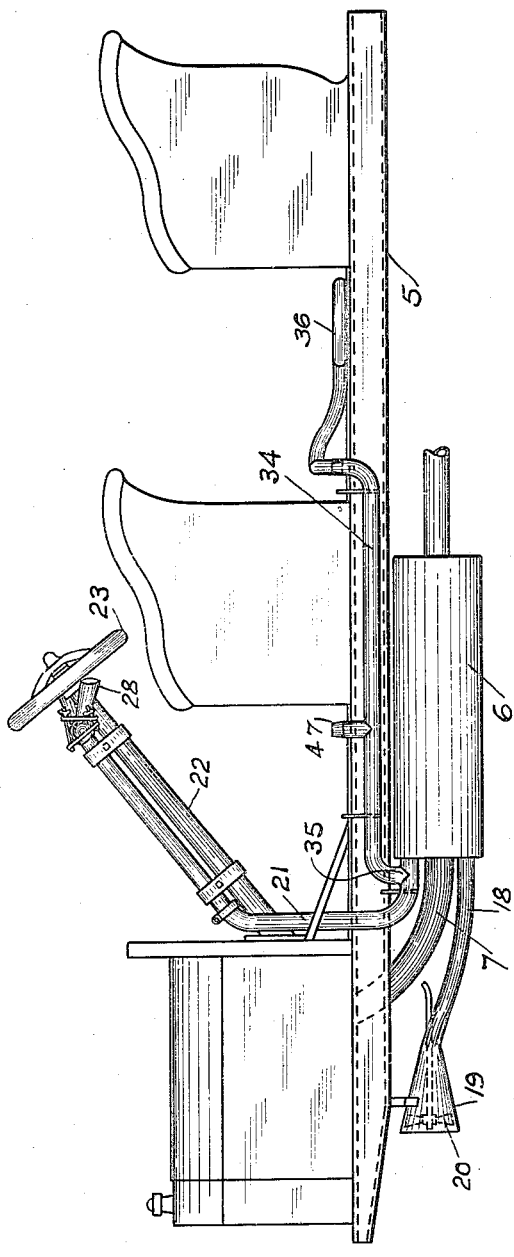
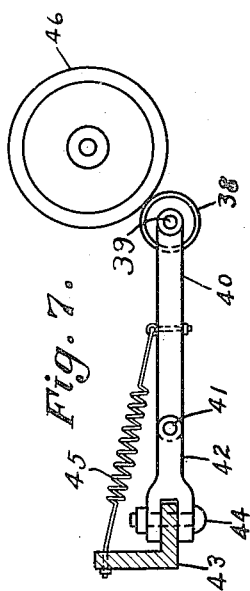
WITNESSES:
AW Pick
E. L. Webber
INVENTOR.
Paine Brier
BY J.M.G. Powell
ATTORNEY

UNITED STATES PATENT OFFICE.

PAINE BRIER, OF DENVER, COLORADO.

HEATING SYSTEM FOR AUTOMOBILES.

1,211,667.          Specification of Letters Patent.          Patented Jan. 9, 1917.

Application filed March 26, 1915. Serial No. 17,175.

*To all whom it may concern:*

Be it known that I, PAINE BRIER, a citizen of the United States, and resident of the city and county of Denver, State of Colorado, have invented certain new and useful Improvements in Heating Systems for Automobiles; and I do declare the following to be a full, clear, and exact description of my invention, such as will enable others skilled in the art to which it appertains to make and use the same, reference being had to the accompanying drawing, and to the figures of reference marked thereon, which form a part of this specification.

My invention relates to improvements in means for employing the exhaust from engines and devoting the same to heating motor vehicles, and the invention has for its object the provision of such means whereby the exhaust is caused to circulate and the heat units thereof directed to different parts of the vehicle for maintaining the temperature in such parts at a comfortable degree.

In the following detail description of my invention, with reference to the accompanying drawing, many other objects will become apparent.

In the accompanying drawings, Figure 1 is a longitudinal section, taken through what will be hereafter referred to as the baffle chamber, shown in Fig. 6; Fig. 2 is a cross sectional view taken through the baffle chamber on the line 2—2, Fig. 1; Fig. 3 is a cross sectional view taken on the line 3—3, Fig. 1; Fig. 4 is plan view of a radiator adapted to be located on the interior of the motor vehicle; Fig. 5 is a heat deflecting member employed on the steering post adjacent the steering wheel; Fig. 6 is a side view of the body of an automobile, illustrating the application of the heating system thereto; and Fig. 7 is a detail view of the connection of the draft fan with the engine.

Corresponding and like parts are referred to in the following description and indicated in all the views of the accompanying drawings by the same reference characters.

Let the numeral 5 designate the body of an automobile, shown for the purpose of illustrating the application of the heating system thereto.

The numeral, 6 represents the baffle chamber in its entirety, as applied to the motor vehicle. This baffle chamber 6 is supported in any convenient position under the body of the vehicle, and is in communication with the exhaust from the engine through a pipe 7, the said pipe 7 communicating with an exhaust circulating chamber 8, the said chamber 8 being formed by the location of a hollow cylindrical member 9 in the outer casing 10 of the baffle chamber. Two reversely arranged spiral baffle plates 12 and 13 are arranged within the exhaust circulating chamber 8 winding around the internal chamber 9, forming paths encircling said internal chamber in which paths the exhaust circulates around the said internal chamber and into a space 14, located at the remote end of the baffle chamber 6 and formed by the outer end of the latter and the end of the internal chamber 9, the said paths, of course, communicating with said space. A pipe 15 communicates with this space 14, through which pipe, the exhaust may pass to the outer atmosphere, or be conveyed to a muffler of the engine, if desired. A space similar to the space 14 is formed in the front end of the baffle chamber 6, with which space the pipe 7 communicates, this pipe being the induction pipe. It will also be noted that the said paths, formed by said baffle plates 12 and 13, also communicate with this last named space, which will be referred to by the reference character 16. Thus the exhaust from the engine, which is always in a heated condition, will first enter the space 16, through the induction pipe 7, and from this space it enters the aforesaid paths and circulates around the internal chamber 9, the baffle plates 12 and 13 serving to retard the passage of the said exhaust in its circulation and absorbs the heat units which are imparted to the atmosphere on the interior of the internal chamber 9. The baffle plates 12 and 13 are provided with perforations 17 at intervals, through which the exhaust is adapted to pass, and as a consequence is further dissipated and retarded in its passage through the baffle chamber.

An air induction pipe 18 passes through the space 16 into the internal chamber 9 and terminates near the remote extremity of said internal chamber. The forward extremity of this induction pipe 18 is provided with a funnel-shaped member 19, in which is journaled a fan 20, operated in a manner hereinafter to be explained, and for the purpose of creating a forced circulation of air through the internal chamber 9 to convey the heat into the body of the vehicle. A pipe 21 is in communication with the forward extremity of the internal chamber 21, and passes through the space 16 to the exterior of the baffle chamber, extending up the steering post 22 and having its discharge extremity located in close proximity to the steering wheel 23, the said discharge extremity of said pipe being separated into two branches 24 and 25, the ends of which are spherically shaped, as shown at 26, to form ball and socket joints with deflectors 27 and 28, the lower extremities of the latter being each provided with a socket 29 which receives the parts 26. The material forming the sockets 29 is turned at right angles to form annular flanges 30, through which bolts 31 pass and connect the said deflectors 27 and 28 with the rings 32, which surround the spherical parts 26 and engage with the latter beyond their central diameters to prevent disengagement therefrom. In this manner the deflectors 27 and 28 are held to the branches 24 and 25 of the pipe 21, and universally connected therewith to permit the same to be turned in any desired position to direct the heat against the hands of the driver of the vehicle. A pipe 34 communicates with the pipe 21, as shown at 35, and extends rearwardly parallel with the body 5 of the vehicle, the rear extremity of said pipe 34 being connected with a coiled radiator 36.

From the foregoing description, it will be understood that air is taken into the internal chamber 9 through the pipe 18 and discharged in the rear extremity of the latter, passing thence from said chamber through the pipes 21 and 34 to the desired positions of the vehicle to be heated. The air in passing through the internal chamber 9 is heated, and the forced draft, now to be explained causes the heated air to pass into the pipes 21 and 34.

A friction pinion 38 is journaled upon a shaft 39, on which the fan 20 is mounted, the said friction pinion 38 being supported by an arm 40, pivoted as shown at 41 to a stub 42, as shown at 43. This stub 42 is secured to a part of the vehicle frame 43, by means of fastening devices 44. A spring 45 connects the arm 40 with the frame 43, whereby the friction wheel 38 is constantly maintained in frictional engagement with the fly wheel 46 of the engine. It will be understood that the form of this spring is immaterial, and that any other means may be employed for holding the said friction wheel 38 in engagement with the fly wheel 46.

By means of the foregoing arrangement, the operation of the engine will transmit power to the shaft 39 operating the fan 20 and causing a forced induction of air through the baffle chamber 6.

The pipe 34 is provided with a nozzle 47 located in close proximity to the front seat of the vehicle, and to which a radiator similar to the one designated 36 may be attached.

While I have described and illustrated herein a specific form of my invention, it is understood that I am not limited thereto and that the same may be modified and varied without departing from the spirit of the invention or the scope of the appended claims.

Having thus described my invention, what I claim and desire to secure by Letters Patent is:

1. Means for heating motor vehicles, comprising a heating member, said heating member consisting of inner and outer members respectively forming inner and outer chambers, reversely arranged spiral baffle plates arranged in the outer chamber, a pipe establishing communication between the exhaust of the engine and said outer chamber, an air induction pipe communicating with the said inner chamber, a third pipe leading from said inner chamber into the body of the vehicle, and a fan journaled in said air induction pipe for creating a draft through said inner chamber.

2. Means for heating motor vehicles, comprising a heating member, said heating member consisting of inner and outer members respectively forming inner and outer chambers, the exhaust from the engine adapted to be conveyed through the said outer chamber, means for inducing air in said inner chamber, and an eduction pipe leading from said inner chamber into the body of the vehicle, and deflectors universally journaled on said eduction pipe and adapted to be located in proximity to the steering wheel of the vehicle.

3. Means for heating motor vehicles, comprising a heating member, said heating member consisting of inner and outer members respectively forming inner and outer chambers, the exhaust from the engine adapted to be conveyed through said outer chamber, reversely arranged spiral baffle plates arranged in the outer chamber adapted to cause the exhaust to circulate in opposite directions around said inner chamber, means for inducing air into the inner chamber, and an eduction pipe leading from said inner chamber into the body of the vehicle.

4. Means for heating motor vehicles, comprising a heating member, said heating member consisting of inner and outer members respectively forming inner and outer chambers, the exhaust from the engine adapted to be conveyed through said outer chamber, means for inducing air into said inner chamber, an eduction pipe leading from said inner chamber into the body of the vehicle, said pipe having a branch thereof extended into close proximity to the steering wheel of the vehicle, and deflectors universally journaled on the extremity of said branch adjacent said steering wheel.

5. Means for heating motor vehicles, comprising a heating member, said heating member consisting of inner and outer members respectively forming inner and outer chambers, a pipe establishing communication between the exhaust of the engine and said outer chamber, an air induction pipe communicating with said inner chamber, a circulating member disposed in the body of the vehicle and communicating with said inner chamber, the outer extremity of said air induction pipe being enlarged, and a fan journaled therein for creating a draft through said inner chamber.

In testimony whereof, I have hereunto affixed my signature in the presence of two witnesses.

PAINE BRIER.

Witnesses:
 ROBT. L. EVANS,
 JOHN G. POWELL.